United States Patent [19]

Miura et al.

[11] Patent Number: 5,584,775

[45] Date of Patent: Dec. 17, 1996

[54] AUTOMATIC TRANSMISSION FOR TRANSVERSE ENGINE VEHICLE

[75] Inventors: Masakatsu Miura, Kariya; Fumitomo Yokoyama, Aichi; Masayuki Tsurumi, Kariya, all of Japan

[73] Assignee: Aisin Aw Co., Ltd., Japan

[21] Appl. No.: 492,541

[22] Filed: Jun. 19, 1995

[30] Foreign Application Priority Data

Jun. 21, 1994 [JP] Japan .................................. 6-163112

[51] Int. Cl.$^6$ ......................... F16H 37/08; F16H 48/06; B60K 17/16
[52] U.S. Cl. ......................... 475/200; 475/205; 475/284
[58] Field of Search ...................... 475/200, 204, 475/205, 206, 284, 285

[56] References Cited

U.S. PATENT DOCUMENTS

| | | | |
|---|---|---|---|
| 4,307,628 | 12/1981 | Yamamori et al. | 475/205 X |
| 4,594,914 | 6/1986 | Kubo et al. | 74/695 |
| 4,711,138 | 12/1987 | Miura et al. | 475/200 X |
| 4,889,621 | 12/1989 | Yamada et al. | 210/168 |
| 5,006,102 | 4/1991 | Takase et al. | 475/285 X |
| 5,203,749 | 4/1993 | Ito | 475/200 X |

FOREIGN PATENT DOCUMENTS

| | | |
|---|---|---|
| 62-141345 | 6/1987 | Japan . |
| 62-141342 | 6/1987 | Japan . |
| 63-47939 | 9/1988 | Japan . |
| 2-35904 | 2/1990 | Japan . |

*Primary Examiner*—Charles A. Marmor
*Assistant Examiner*—Nathan O. Jensen
*Attorney, Agent, or Firm*—Lorusso & Loud

[57] ABSTRACT

An automatic transmission for a transverse engine vehicle having a first shaft aligned with an engine crankshaft, a second shaft and third shafts driving front wheels of the vehicle. The first, second and third shafts are arranged in a triangular configuration in an end view. A fluid coupling, a main transmission and a counter drive gear are arranged on the first shaft. A counter driven gear, meshing with the counter drive gear, and a reduction gear are both arranged on the second shaft. A differential unit is interposed to drive the third shafts and has a ring gear meshing with the reduction gear. The counter drive gear is located on the first shaft between the fluid coupling and the main transmission, has a supporting boss portion extending toward the main transmission and is supported by the transmission case. The first shaft extends from the fluid coupling and through the counter drive gear for connection to at least one input element of the main transmission. The differential unit has a casing with left-hand and right-hand extensions which are supported by the transmission case through bearings. The plane of rotation of the ring gear and reduction gear meshed therewith is interposed between the planes in which the bearings support the left-hand and right-hand extensions.

8 Claims, 7 Drawing Sheets

|  | C1 | C2 | C3 | B1 | B2 | B3 | F1 | F2 |
|---|---|---|---|---|---|---|---|---|
| 1ST | O |  |  |  | (O) | O | O | O |
| 2ND | O |  |  | O |  | O |  | O |
| 3RD | O | O |  |  |  | O |  | O |
| 4TH | O | O | O |  |  |  |  |  |
| REV. |  | O |  |  | O | O |  |  |

(O) : E/G Braking

|  | C1 | C2 | B1 | B2 | F1 |
|---|---|---|---|---|---|
| 1ST | O |  |  | (O) | O |
| 2ND | O |  | O |  |  |
| 3RD | O | O |  |  |  |
| REV. |  | O |  | O |  |

(O) : E/G Braking (O): E/G Braking

| | C1 | C2 | C3 | B1 | B2 | B3 | B4 | F1 | F2 |
|---|---|---|---|---|---|---|---|---|---|
| 1ST | O | | | | (O) | | (O) | O | O |
| 2ND | O | | | O | | | (O) | | O |
| 3RD | O | | | O | | O | | | |
| 4TH | O | | O | O | | | | | |
| 5TH | O | O | O | | | | | | |
| REV. | | O | | | O | | O | | | ained to be used in a transverse engine vehicle.

AUTOMATIC TRANSMISSION FOR TRANSVERSE ENGINE VEHICLE

BACKGROUND OF THE INVENTION

1. Field of the Invention

The present invention relates to an automatic transmission to be used with a fluid coupling such as a torque converter and, more particularly, to a structure of an automatic transmission to be used in a transverse engine vehicle.

2. Related Art

Examples of automatic transmissions designed for use in a transverse engine vehicle are disclosed in Japanese Patent Publication No. 47939/1988 and in Japanese Patent Laid-Opens Nos. 141345/1987, 141342/1987 and 35904/1990.

The transmission disclosed in Japanese patent publication No. 47939/1988 includes a front planetary gear unit and a rear planetary gear unit, all aligned with an engine crankshaft. A first shaft aligned with the crankshaft at its rear end carries a counter drive gear. A second shaft, in parallel with the first shaft, carries a planetary gear unit for an underdrive and a counter driven gear at its rear end. A third shaft, in the form of axles extending from a differential unit is arranged to form a triangle, together with the first shaft and the second shaft, when viewed on end.

In the latter three mentioned publications a first shaft is arranged as output of a torque converter, with a main transmission and a counter drive gear mounted thereon. A second shaft carries a planetary gear unit for an underdrive and a counter driven gear; and a third shaft is connected to a differential unit. The counter drive gear is mounted at the central portion of the first shaft and, at the front end portion, i.e., near the torque converter, are arranged a brake unit including a brake for the main transmission, a one-way clutch unit including a 2nd coast brake ($B_1$), a 2nd brake ($B_2$) and a first one-way clutch ($F_1$).

An automatic transmission (A/T) for a transverse engine vehicle is difficult to mount because it is mounted together with the engine in the restricted space under the bonnet. As shown in FIG. 10(a), a first shaft 1 aligned with the crankshaft of an engine (E/G) extends from a torque converter, through a main transmission and so on. This requires the first shaft to be so long that it can interfere with front wheel 4, restricting its steering angle. Accordingly, the first shaft should be of such a length as to leave a clearance C for the front wheel to allow a predetermined steering angle.

As shown in FIG. 10(b), the second shaft 2 which carries a planetary gear unit for the underdrive is positioned at the highest position of a triangle which is formed by itself together with the first shaft 1 and a third shaft 3. The tendency in recent years is to enhance the rigidity of the vehicle by arranging a side member 6 at an upper side portion of the bonnet in addition to a sub-frame 5 arranged in the lower portion and forming part of the chassis. Therefore, the second shaft 2 should be spaced from side member 6 to provide a predetermined clearance D to avoid interference with the side member 6.

Moreover, the third shaft 3 extends from the differential unit through a universal joint to support left-hand and right-hand wheels. Since this universal joint has its strength reduced if its bending angle becomes large, it dictates the position of the differential unit widthwise of the vehicle.

In the aforementioned automatic transmission of Japanese patent publication No. 4739/1988, the first shaft carries the counter drive gear at its rear end so that the counter driven gear on the second shaft is coplanar with the drive gear. Because the second shaft must therefore be as long as the first shaft, it interferes with the side member 6. This arrangement makes it difficult to mount the automatic transmission on the vehicle, with enhancement of the rigidity of the vehicle by the side member.

In the aforementioned automatic transmission of Japanese publications 141345/1987, 141342/1987 and 35904/1990, on the other hand, the counter drive gear is arranged generally centrally of the first shaft. This allows the drive gear to be arranged at the front end side of the second shaft so that the second shaft can be made shorter than the first shaft. However, the brake unit is arranged at the front end side of the counter drive gear of the first shaft so that the counter drive gear on the second shaft must be displaced from the center. As a result, the spacing of the second shaft portion from the first shaft portion may not be sufficient to provide for the clearance D, depending upon the position, size and so on of the side member.

Moreover, because the counter driven gear is arranged at the central portion of the second shaft, the reduction gear adjacent to the driven gear is also centrally located. On the other hand, the differential unit arranged on the third shaft has its widthwise position with respect to the vehicle body dictated by the aforementioned bending angle of the universal joint. As a result, the ring gear fixed on the differential unit and meshing with the reduction gear overhangs the differential unit in one direction, as in the automatic transmission of Japanese patent publication 47939/1988. Hence, the ring gear has its meshing plane (plane of rotation) transversely extending through the bearings supporting the differential unit. As a result, the ring gear meshing with the reduction gear with a high radial force exerts a high biasing force upon the bearings supporting the differential unit, adversely affecting the durability and reliability of the bearings.

SUMMARY OF THE INVENTION

It is, therefore, an object of the present invention to provide an automatic transmission for a transverse engine vehicle, which is improved in its mountability by making it more compact, especially its second shaft portion.

Another object is to improve the durability and reliability of the bearings supporting the differential unit.

To achieve the foregoing objects, the present invention provides an automatic transmission (T) for a transverse engine vehicle which includes, as seen in FIG. 1, a first shaft (1) aligned with an engine crankshaft; second and third shafts (2) and (3l, 3r) which, together with the first shaft, are in a triangular arrangement in a view from the ends of the shafts; and a fluid coupler (10). A main transmission section (11) and a counter drive gear (12) are arranged on the first shaft and a counter driven gear (13), meshing with the counter drive gear, and a reduction gear (15) are both arranged on the second shaft. The third shaft (3l, 3r) extends from a differential unit (17) which carries a ring gear (16) meshing with the reduction gear. The counter drive gear (12) is arranged on the first shaft (1) between the fluid coupling (10) and the main transmission section (11) and has a supporting boss portion (12a) extending toward the main transmission section (11) and is supported by the case (19). The first shaft (1) extends from the fluid coupling (10) through the counter drive gear (12) and is connected to the input elements (C1) and (C2) of the main transmission (11). The differential unit (17) is supported at left-hand and right-hand extensions of its housing (17a, 17b) by the case (19) through bearings (20) and (21). The meshing plane (A—A) of the ring gear (16) with the reduction gear (15) is interposed between the supporting planes (B—B) and (B'—B') of the differential unit housing.

The main transmission section (11) includes first and second single planetary gear units (22) and (23) having their sun gears (S1) and (S2) connected to each other. The carrier (CR1) of the first planetary gear unit and the ring gear (R2) of the second planetary gear unit are connected to each other and to the counter drive gear (12). The first shaft (1) extends from the fluid coupling (10) and serves as an input shaft by connection through a forward clutch (C1) to the ring gear (R1) of the first planetary gear (22) and through a direct clutch (C2) to the sun gears (S1) and (S2). The sun gears (S1) and (S2) are selectively held against rotation by first retaining means (B1) whereas the carrier (CR2) of the second planetary gear (23) is selectively held against rotation by the second retaining means (B2 or F2). The first shaft (1) extends through the fluid coupling (10), the counter drive gear (12) and the main transmission (11) to the rear end, where it is connected to the forward clutch (C1) and the direct clutch (C2).

A 2nd speed auxiliary transmission (42) is arranged on the second shaft and includes a single planetary gear unit (as shown in FIGS. 1 to 3). The counter driven gear (13) and the reduction gear (15) are fixed directly to the second shaft (as shown in FIGS. 4 to 6). A 3rd speed auxiliary transmission (55) is arranged on the second shaft and includes a composite planetary gear unit (as shown in FIGS. 7 to 9).

With the construction described above, the rotation of the engine crankshaft is transmitted through the fluid coupling (10), such as a torque converter or other fluid coupling, to the first shaft (1). The speed of this input rotation is changed by the main transmission section (11) into a forward 3rd speed or a reverse 1st speed, for example, and is output by the main transmission section through the counter drive gear (12) and the driven gear (13) to the second shaft (2).

Since the counter drive gear (12) is arranged on the first shaft (1) facing the fluid coupling (10), the counter driven gear (13), meshing with the drive gear (12) and positioned in a common plane therewith, is also located near the fluid coupling, so that the second shaft (2) supporting the driven gear (13) is also positioned in its entirety at the side of the fluid coupling (or "front end side"). As a result, the second shaft (2), forming the highest point of the aforementioned triangle, has its rear end recessed from the rear end of the first shaft.

The rotation of the drive gear (13) is transmitted to the reduction gear (15), either directly or after its speed has been suitably changed by the 2nd speed auxiliary transmission, so that its speed is decelerated at a predetermined differential ratio. The rotation is then transmitted through the ring gear (16) through the differential unit (17) and finally to the left-hand and right-hand axles (or the third shaft) 3l and 3r.

Since the second shaft (2) is positioned in its entirety at the front end side, as described above, the reduction gear (15) adjacent to the counter driven gear (13) is also offset to the front end side so that the ring gear (16) meshing with the reduction gear (15) is also located at the front end side. As a result, the plane of rotation (A) of the ring gear (16) is interposed between the supporting planes (B) and (B') of the left-hand and right-hand bearings (20) and (21) of the differential unit (17) so that the bearings (20) and (21) support the radial force received by ring gear 16 with minimal force on ring gear 16 tending to tilt its plane of rotation (A).

As has been described hereinbefore, according to the present invention, the counter drive gear (12) is arranged close to the fluid coupling (10) (close to the front end) so that the second shaft (2), with the counter driven gear (13) meshing with the drive gear 12, can be brought closer to the front end side. As a result, the second shaft, located at the peak of the aforementioned triangular arrangement, can have its rear end portion shortened to prevent its interference with the side member (6), thereby improving adaptability for mounting.

In a preferred embodiment, the counter drive gear (12) is positioned at the front end side by extending the first shaft (input shaft) (1) to the rear end and connecting it to the forward clutch (C1) and the direct clutch (C2). Thus, the mountability can be improved, as described above.

The number of gear stages which can be achieved depends on whether the counter driven gear is mounted directly on the second shaft or through a transmission unit and, if through a transmission unit, further depends on the nature of the transmission mounted on the second shaft.

BRIEF DESCRIPTION OF THE DRAWINGS

FIG. 5 is a skeletal diagram of the second embodiment;

FIG. 6 is a table illustrating the operations of the second embodiment;

DESCRIPTION OF THE PREFERRED EMBODIMENTS

Figure 1:
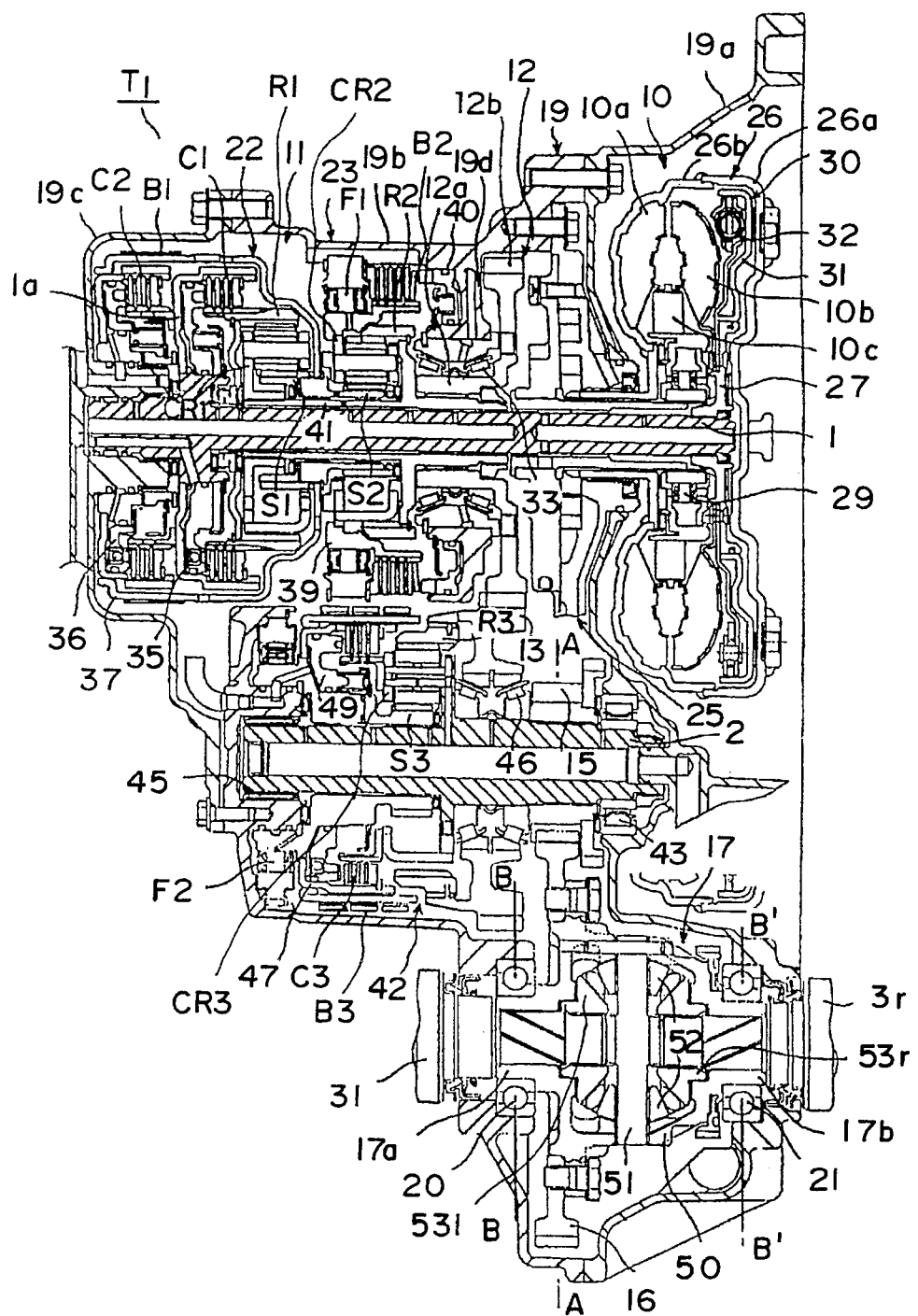
FIG. 1 is a longitudinal cross-sectional view of a four-speed automatic transmission which is a first embodiment of the present invention.
Figures 2, 3:
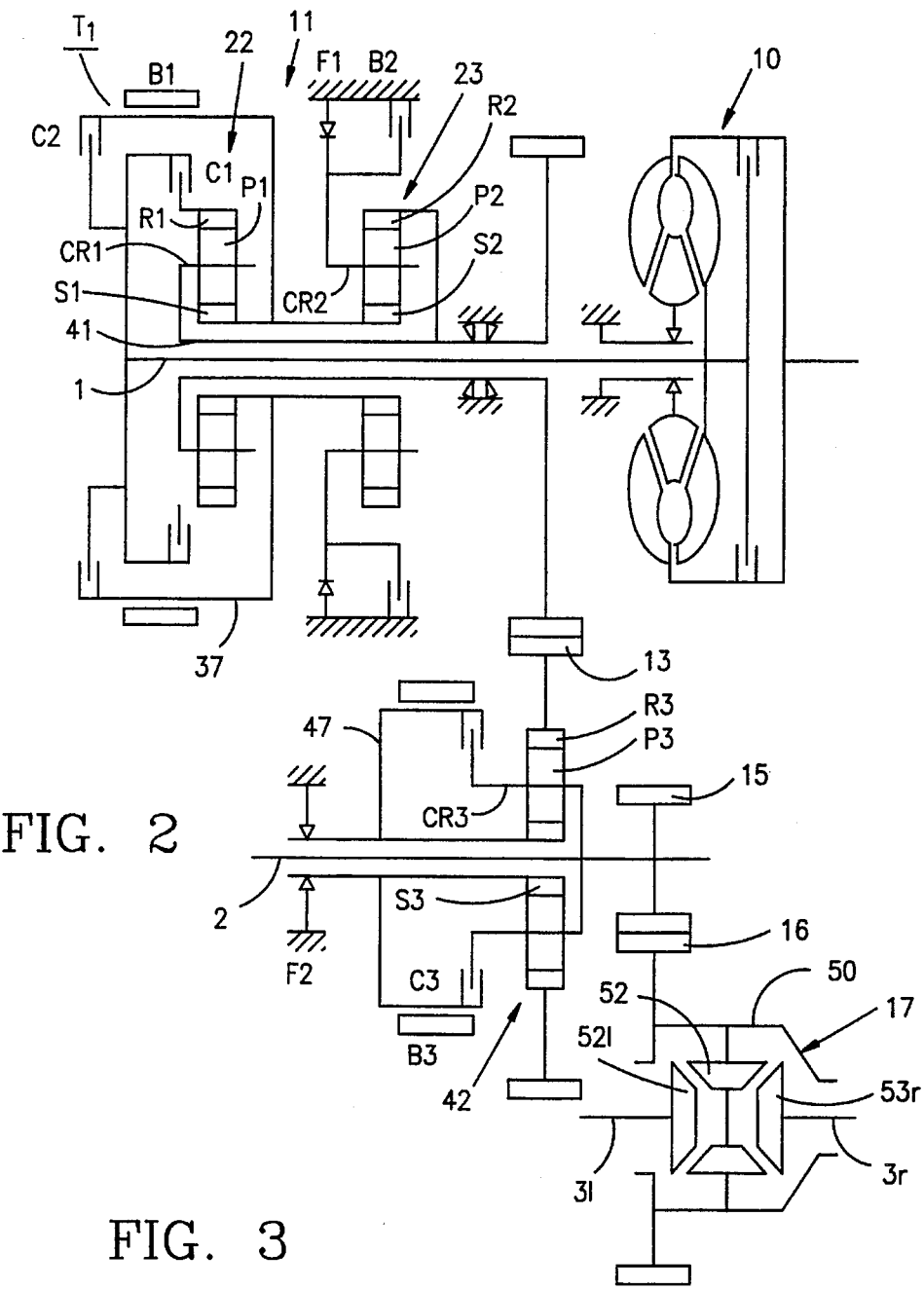
FIG. 2 is a skeletal diagram of the first embodiment.
FIG. 3 is a table of the operations of the first embodiment, wherein "O" indicates engagement of the frictional engagement element, "(O)" indicates engine braking and absence of a symbol indicates disengagement.

A four-speed automatic transmission $T_1$, designed for use in a transverse engine vehicle of the front wheel drive type, is shown in FIGS. 1 and 2 as including an integral case 19 which is composed of a transaxle case 19a, a transmission case 19b and a transmission cover 19c. First, second and third shafts 1, 2 and 3 are arranged in a triangle in a side view looking along a line of sight parallel to their axes.

A first shaft 1, serving as an input shaft, is aligned with the engine crankshaft and carries thereon a torque converter 10, a counter drive gear 12 and a main transmission 11, sequentially from the front end to the rear end. Moreover, an oil pump 25 is fixed to the case 19 between the torque converter 10 and the drive gear 12. The input shaft 1 extends from the torque converter 10 through the pump 25, the drive gear 12 and the main transmission 11 to the rear where its rear end is supported by the cover 19c.

The torque converter 10 is contained in a converter housing 26 which is composed of a front cover 26a, fixed by the drive plate to act as an input element, and a case 26b. The torque converter 10 includes a pump blade 10a integrated with the case 26b, a turbine blade 10b integrally connected to a turbine hub 27 acting as an output element, and a stator blade 10c which is rotatable in one direction only through a one-way clutch 29. These blades constitute a truss. Between this truss and the front cover 26a, is a lockup clutch 30 which is composed of a clutch plate 31 and a damper 32 with two kinds of springs. When the clutch plate 31 comes into contact with the front cover, the rotation of the crankshaft of the engine is transmitted through the front cover 26a, the clutch plate 31 and the damper 32 directly to the turbine hub 27 and further to the input shaft 1 which is splined to the hub 27.

The counter drive gear 12 is located between the main transmission 11 and the torque converter 10, that is, in a position adjacent to the torque converter 10 but separated therefrom by the pump 25. A boss 12a constituting the supporting portion of the drive gear 12 extends toward the main transmission and is rotatably supported by a partition 19d of the case 19 through a pair of tapered roller bearings 33. As a result, the drive gear 12 has its gear teeth portion 12b mounted/arranged in the front end portion of the transmission case 19b, close to the pump 25.

The main transmission 11 includes a first single planetary gear unit 22 arranged at the rear end side and a second single planetary gear unit 23 which is arranged in the central portion of the case 19 and which is of the Simpson type. The two planetary gear units 22 and 23 have their sun gears S1 and S2 connected to each other. The carrier CR1 of the first planetary gear 22 and the ring gear R2 of the second planetary gear 23 are also connected to each other. Toward the rear end of the input shaft 1 is connected a flange 1a which, in turn, has its front side connected to a forward clutch C1 and its rear side connected to a direct clutch C2. Hydraulic pistons 35 and 36 are disposed adjacent these clutches.

The direct clutch C2 has its drum side (or its output side) connected to a cylindrical member 37, which, in turn, extends around the forward clutch C1 and the first planetary gear 22 for connection to the sun gears S1 and S2. On the other hand, the forward clutch C1 has its hub side (or its output side) connected to a first ring gear R1. Around the cylindrical member 37, moreover, there is arranged a first (or second) brake B1 which is a band brake. Between a drum member 39 connected to a second carrier CR2 and the case 19, there are a first one-way clutch F1 and a second (or first & reverse) brake B2 which is a multi-disc brake. A hydraulic piston 40 is arranged to operate the second brake B2. Moreover, an output sleeve 41 connecting the first carrier CR1 and the second ring gear R2 is splined to the inner circumference of the boss portion 12a of the counter drive gear, and the planetary gear portion has a triple shaft structure which is composed of the input shaft 1, the sleeve 41 and the interconnected sun gears S1 and S2.

On the second shaft 2 located in the highest position (peak) of the triangle, are arranged sequentially from the engine (or the front end) a reduction gear 15, a counter drive gear 13 and an auxiliary transmission 42. This second shaft 2 is a counter shaft having its two end portions supported by the case 19 through a roller bearing 43 and a needle bearing 45. The reduction gear 15 is splined to the front end portion of the counter shaft 2, and the counter driven gear 13 is rotatably supported near the reduction gear 15 through a pair of tapered roller bearings 46. As a result, the counter driven gear 13 is positioned in the same plane as the counter drive gear 12 while meshing with same. The reduction gear 15 is arranged closer to the engine (front end) than the driven gear 13 and as a result, the counter shaft (or the second shaft) 2 is positioned, in its entirety, close to the engine.

The auxiliary transmission 42 is composed of a (third) single planetary gear unit serving as an under drive mechanism and having its ring gear R3 directly connected to the driven gear 13 and its carrier CR3 connected to the counter shaft 2. This carrier CR3 is further connected through a UD direct clutch C3 to a drum member 47. A hydraulic piston 49 is disposed adjacent to the clutch 3 for operation thereof. The drum member 47 is connected at its rear end side to a sun gear S3. A one-way clutch F2 is interposed between the drum member 47 and the case 19. The drum member 47 is encircled by a third (UD) brake B3 in the form of a band brake.

On the third shaft 3, i.e., 3l and 3r, located at the lower rearmost position of the triangle in the side view, is arranged a differential unit 17. This differential unit 17 is equipped with a differential case 50 which has left-hand and right-hand supporting extensions rotatably supported through left-hand and right-hand ball bearings 20 and 21, respectively. On the differential case 50, moreover, there is directly mounted a planar ring gear 16 by means of bolts. This ring gear 16 is in meshing engagement with the reduction gear 15. Here, the differential unit 17 has its position, widthwise of the vehicular, dictated by the bending angle of the universal joint. Since the reduction gear 15 is arranged closer to the front end (the engine end), as described before, the meshing plane A—A, in which the ring gear 16 and the reduction gear 15 meshed therewith lie, is positioned close to the engine so that the meshing plane A—A is interposed between the supporting planes B—B and B'—B' of the bearings 20 and 21, based upon the position of the differential unit 17.

The differential case 50 has a shaft 51, perpendicular to the third shaft, which rotatably supports a pair of differential bevel gears 52. The supporting extensions 17a and 17b of the differential case 50 rotatably support the left-hand and right-hand axles 3l and 3r. At the interior ends of these axles are respectively fixed left-hand and right-hand side bevel gears 53l and 53r which mesh, respectively, with the aforementioned differential gears.

Operation of the foregoing first embodiment will now be described with reference to FIG. 3.

At the forward 1st speed in the D and 2nd ranges, the forward clutch C1 is applied, and the third brake B3 and the first and second one-way clutches F1 and F2 are likewise engaged. In this state, the rotation transmitted from the engine through the torque converter 10 to the input shaft 1 is transmitted through the forward clutch C1 to the first ring gear R1 and further to the first carrier CR1 and the output sleeve 41 integrated with the first carrier CR1, to rotate a second carrier CR2 through the first and second sun gears S1 and S2. However, the first one-way clutch F1 limits this rotation to the pinion P2 so that the second ring gear R2, integral with the first carrier CR1, is rotated. As a result, the counter drive gear 12, connected to the carrier CR1 and the ring gear R2, is rotated in the 1st speed state of the main transmission 11.

Moreover, the rotation of the counter drive gear 12 is transmitted through the driven gear 13 to the ring gear R3 of the auxiliary transmission 42 for output of decelerated rotation from the carrier CR3, since the rotation of the sun gear S3 is blocked by the second one-way clutch F2 and the third brake B3. The rotation of the carrier CR3 is transmitted through the counter shaft 2 to the reduction gear 15 and further through the ring gear 16 to the differential unit 17, with differentiated rotations transmitted to the left-hand and right-hand axles 3l and 3r.

In the 1st speed of the 1st range, the second coast brake B2 is also active to hold the 1st speed state even with reverse rotation of the second carrier CR2, i.e., at the time of the reverse torque flow from the wheels to the engine, i.e. in engine braking.

In the forward 2nd speed, the forward clutch C1 is applied, and the first brake B1, the third brake B3 and the second one-way clutch F2 are engaged. In this state, the rotation of the input shaft 1 is transmitted through the forward clutch C1 to the first ring gear R1. The rotation of the ring gear, in turn, is transmitted through the first carrier CR1 and the output sleeve 41 to the counter drive gear 12 because the first and second sun gears S1 and S2 are locked by the first brake B1. The rotation of the drive gear 12 is decelerated and transmitted to the differential unit 17 because the auxiliary transmission 42 is in the same state as that in the preceding 1st speed.

In the forward 3rd speed, the forward clutch C1 and the direct clutch C2 are applied, and the third brake and the second one-way clutch F2 are engaged. In this state, the rotation of the input shaft 1 is transmitted through the forward clutch C1 to the first ring gear R1 and through the direct clutch C2 to the sun gears S1 and S2 and further to the counter drive gear 12 because the planetary gear units 22 and 23 are in their directly connected states. This rotation is transmitted to the differential unit 17 through the auxiliary transmission 42 which is in the decelerating (or UD) state, as at time of the aforementioned 1st and 2nd speeds.

In forward 4th speed, the forward clutch C1, the direct clutch C2 and the UD direct clutch C3 are applied. In this state, the main transmission 11 is in the same state as in the aforementioned 3rd speed, so that rotation is directly transmitted from the counter drive gear 12 to the counter driven gear 13. Then, the rotation of the ring gear R3 received from the driven gear 13 is further transmitted directly to the counter shaft 2 through the carrier CR3 of the planetary gear, which is integrated with the UD direct clutch C3. As a result, rotation at the same speed as that of the input shaft 1 is transmitted to the counter shaft 2 and is decelerated on the basis of the differential ratio, which is predetermined by the reduction gear 15 and the ring gear 16, and then transmitted to the differential unit 17.

In reverse, the direct clutch C2 is applied, and the second brake B2 and the third brake B3 are engaged. In this state, the rotation of the input shaft 1 is transmitted through the direct clutch C2 to the sun gears S1 and S2. Since the second carrier CR2 is held stationary by the second brake B2, the rotation of the sun gear S2 is transmitted through the pinion P2 to the second ring gear R2 so that reverse rotation is transmitted to the counter drive gear 12. Moreover, the auxiliary transmission 42 is in the decelerating (UD) state so that the reverse rotation is decelerated prior to transfer to the differential unit 17.

In the four-speed automatic transmission $T_1$ thus described, the torque path is from the torque converter through the input shaft 1 to the rear end and then back through the main transmission 11 to the counter drive gear 12 at the front end side. Hence, the counter driven gear 13 meshing with the drive gear 12 is also positioned close to the front end so that the counter shaft (or the second shaft) 2 is arranged in its entirety close to the engine (or the front end). As a result, the extent to which the second shaft 2 extends backward, is considerably short of the rear end of the first shaft 1 so that it does not interfere with the side members 5, 6 thereby improving the mountability. Because the counter shaft 2 is close to the engine, the reduction gear 15 can also be located at the engine side. As a result, although the plane of rotation A—A of the ring gear 16 meshing with the reduction gear 15 is located at the engine side, whereas the differential unit 17 is positioned widthwise on the vehicle so that ring gear meshing plane A—A is interposed between the bearing supporting planes B—B and B'—B' of bearings 20 and 21 so that the bearings 20 and 21 are free of high load based upon a biasing force, thereby improving their durability and reliability.

Figure 4:
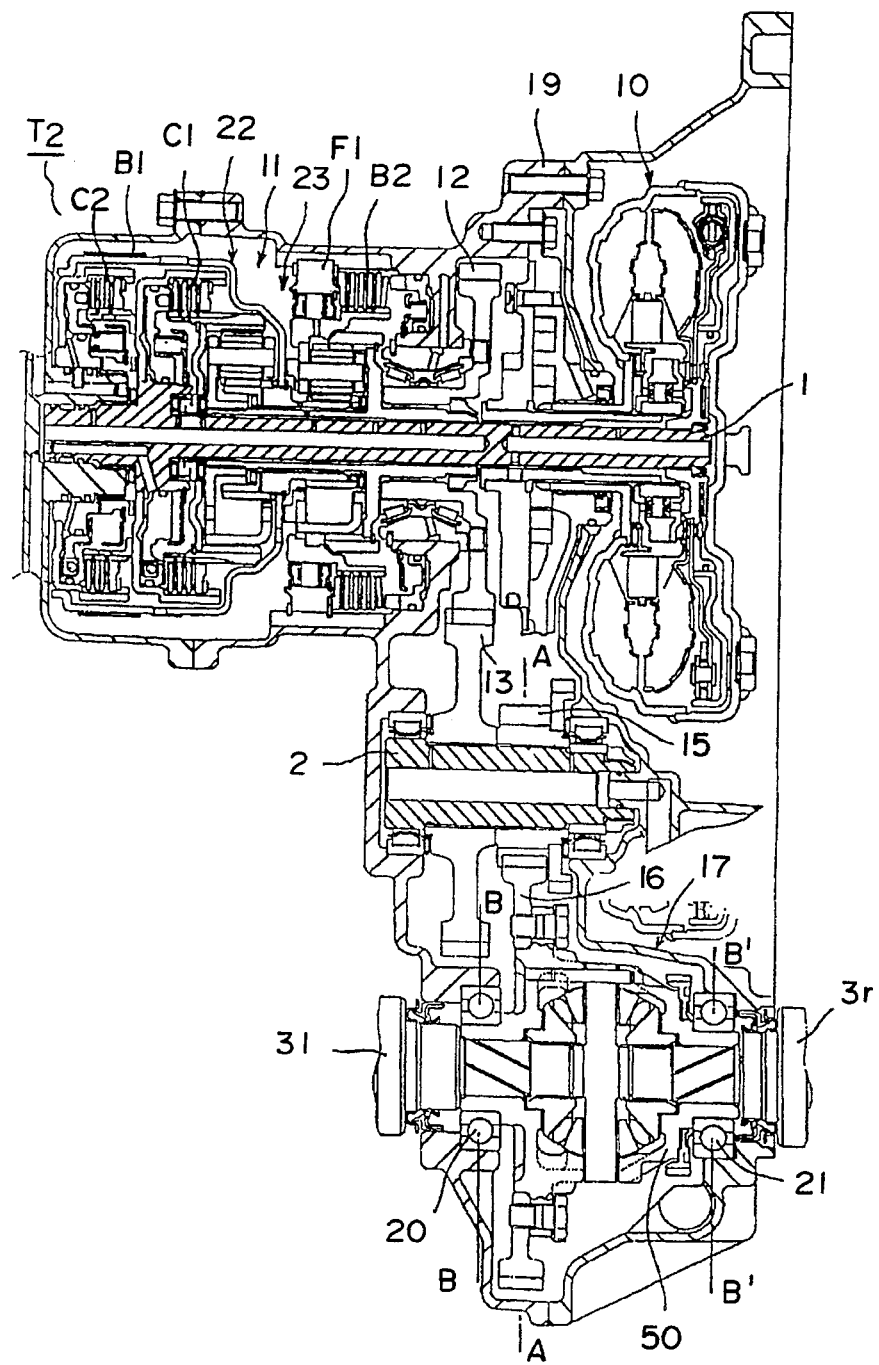
FIG. 4 is a longitudinal cross-sectional view of a three-speed automatic transmission which is a second embodiment of the present invention.
Figures 5, 6:
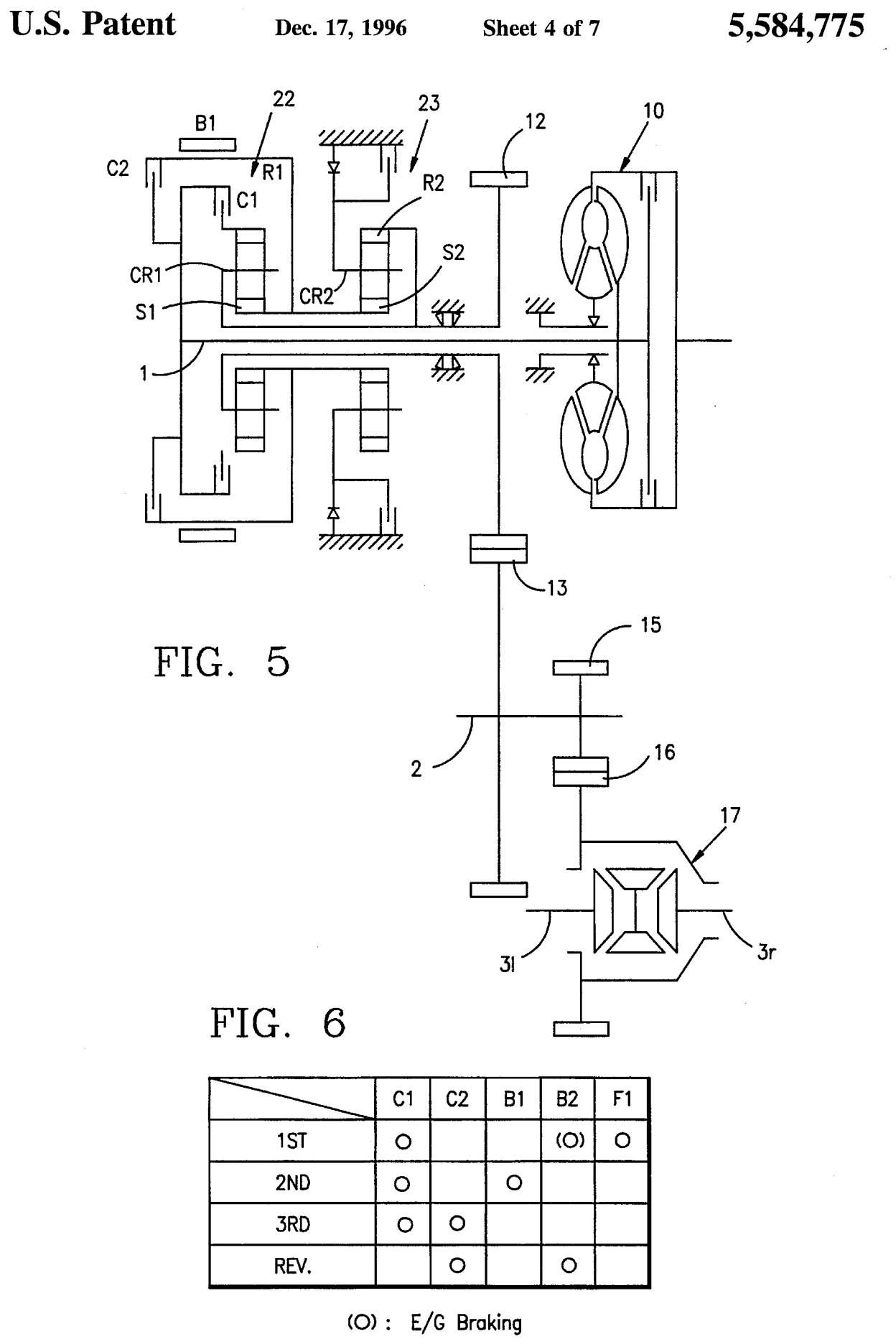

FIGS. 4 to 6, show a second embodiment of the present invention applied to a three-speed automatic transmission $T_2$. In the second embodiment the first shaft portion and third shaft portion are similar to those of the first embodiment already described, and these portions, designated by common reference numerals, will not again be described.

However, in this second embodiment the second shaft, or "counter shaft" 2 is directly splined to the counter driven gear 13 and to the reduction gear 15 which abuts the engine side of the driven gear 13.

The three-speed automatic transmission $T_2$ of the second embodiment changes speeds as indicated in the table of FIG. 6. The rotation of the counter drive gear 12 is transmitted through the driven gear 13 to the counter shaft 2 and further to the differential unit 17 after it has been decelerated to a predetermined differential ratio by the reduction gear 15 and the ring gear 16.

In the second embodiment, too, the rear end of the second shaft is much closer to the torque converter than the rear end of the first shaft to improve the mountability. As in the first embodiment, the meshing plane of rotation A—A of the ring gear 16 is interposed between the bearing supporting planes B—B and B'—B' of the differential unit 17 to improve the durability and reliability of the bearings 20 and 21.

Figure 7:
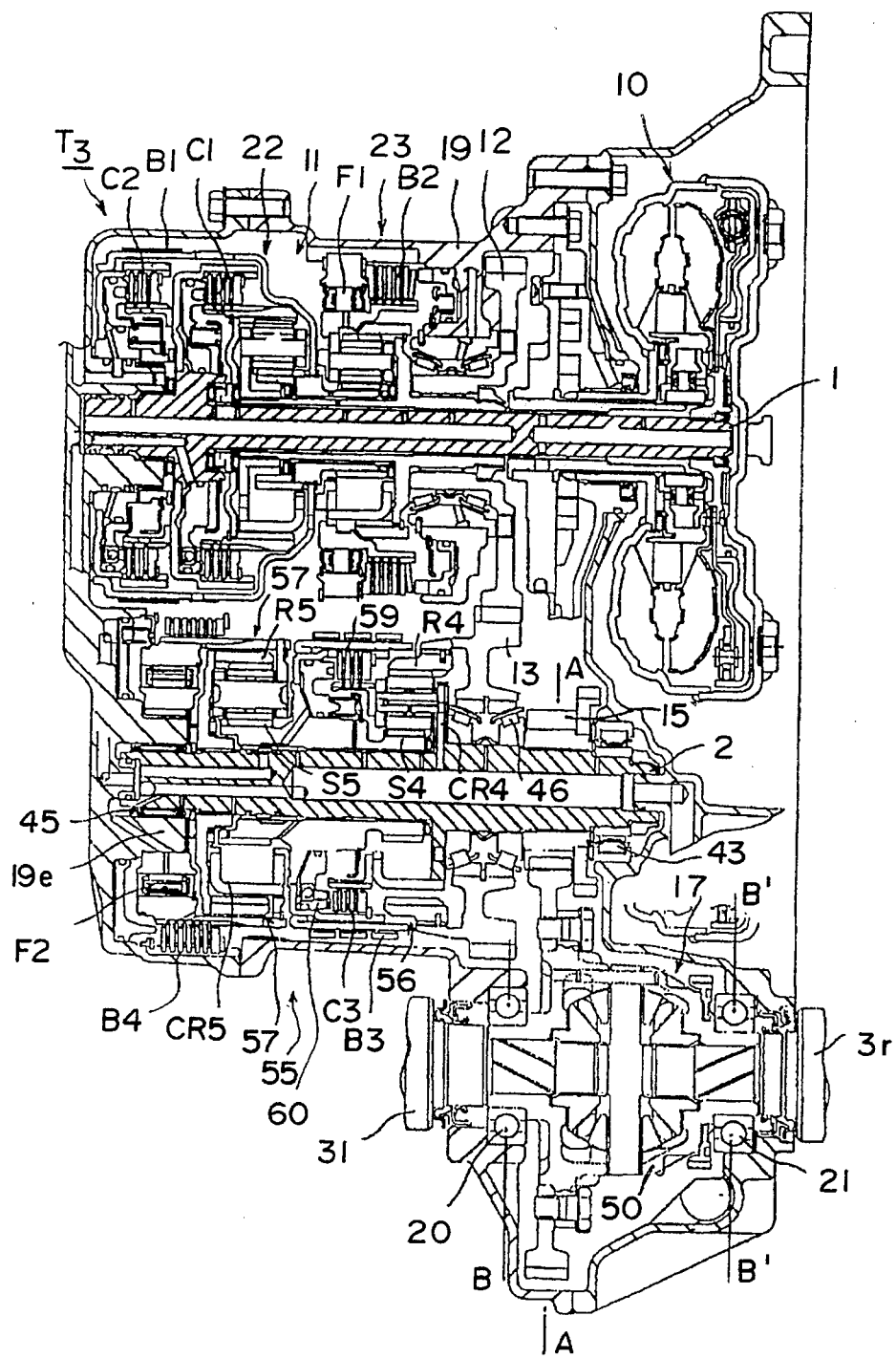
FIG. 7 is a longitudinal cross-sectional view of a five-speed automatic transmission which is a third embodiment of the present invention.
Figures 8, 9:
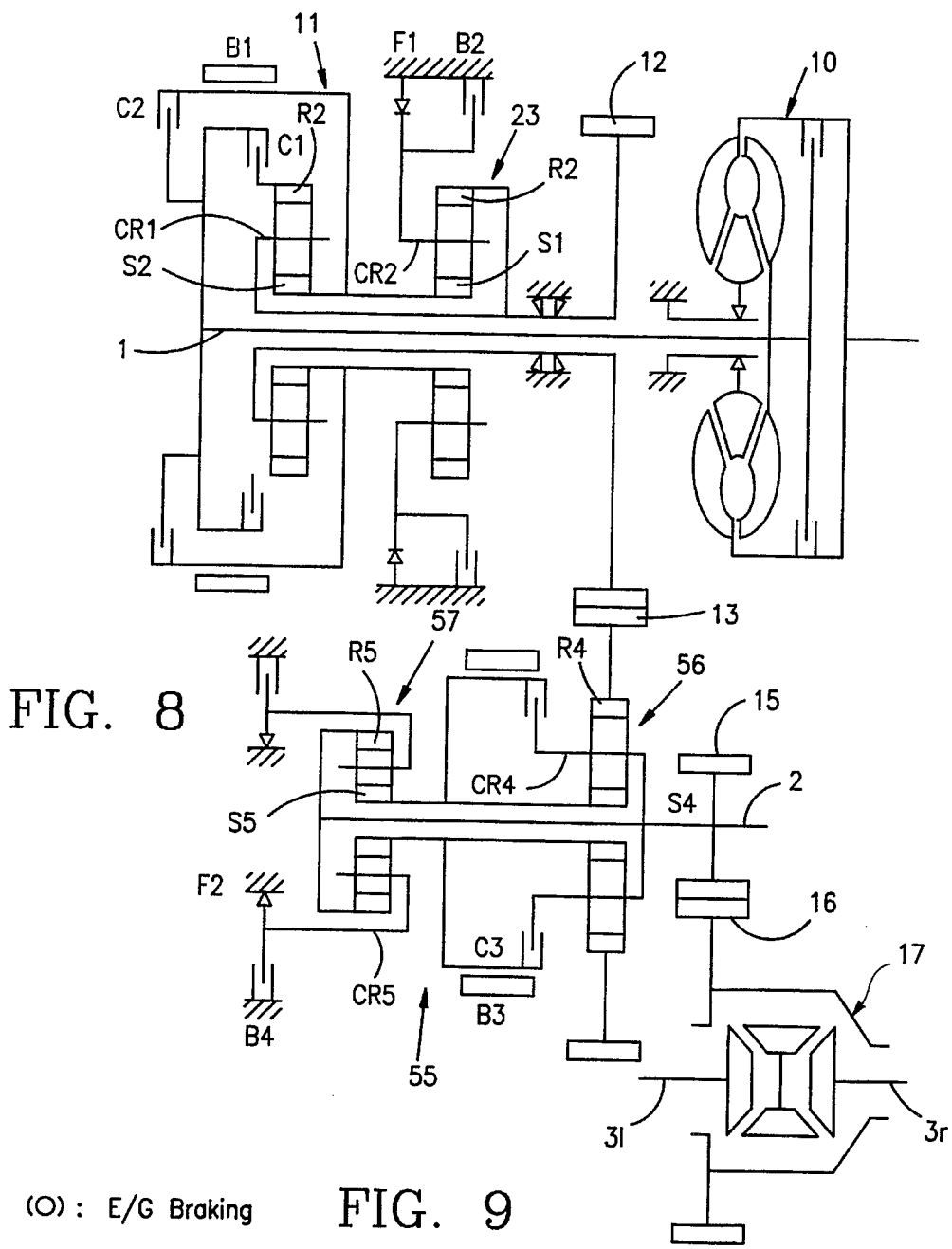
FIG. 8 is a skeletal diagram of the third embodiment.
FIG. 9 is a table illustrating the operations of the third embodiment.
Figure 10A:
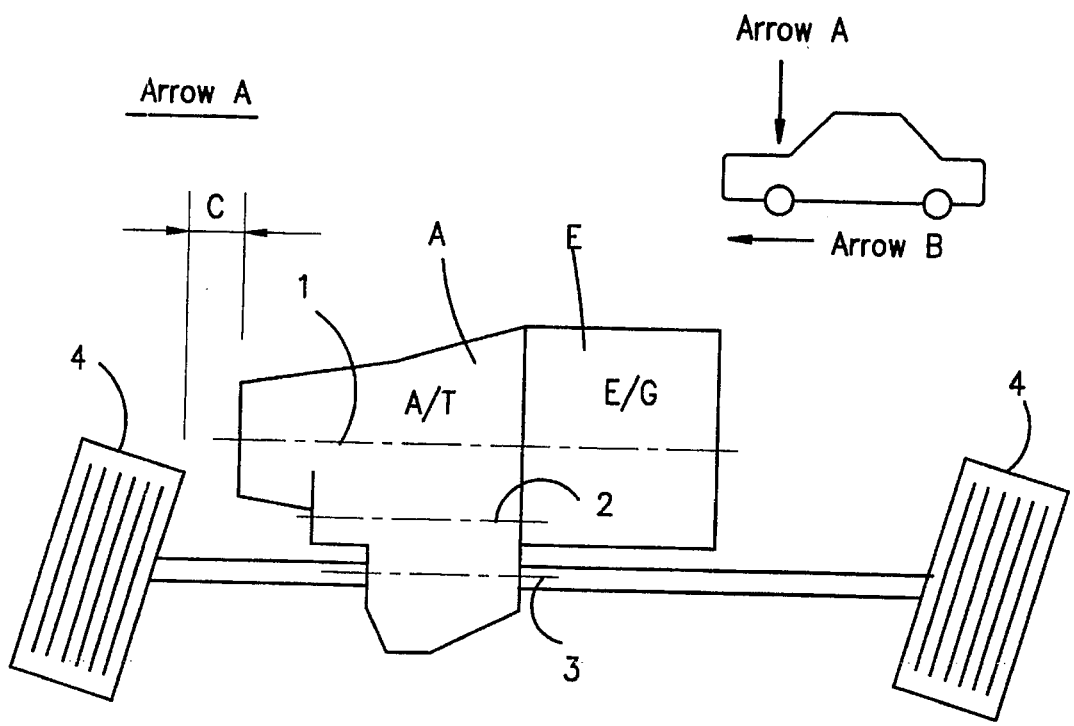
FIG. 10A is a schematic diagram showing the mounting of an automatic transmission in a transverse engine vehicle, taken in the direction of arrow A.
Figure 10B:
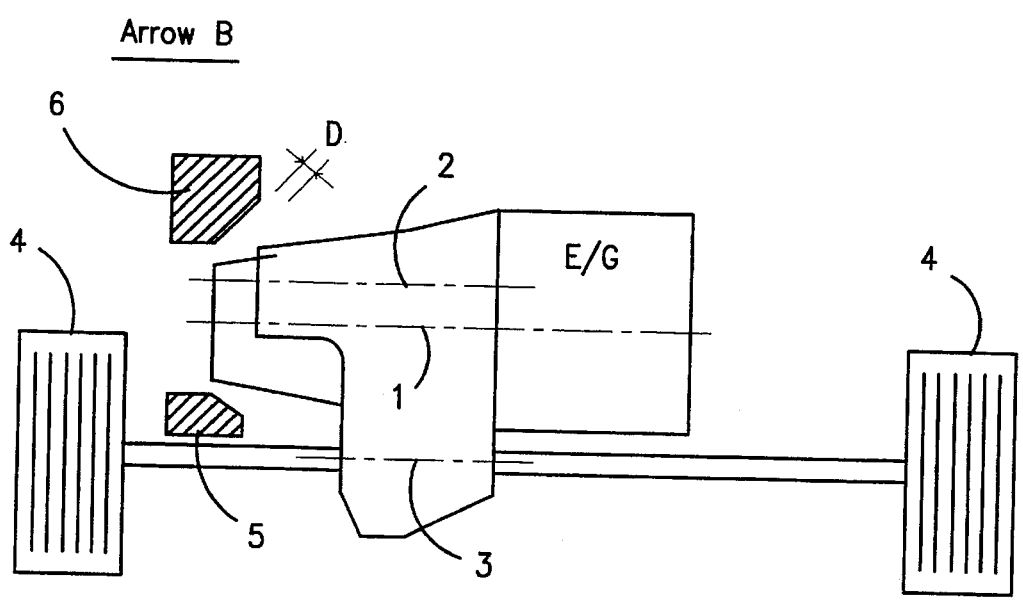
FIG. 10B is a schematic diagram showing the same, but taken in the direction of arrow B.

FIGS. 7 to 9 show a third embodiment wherein the present invention is applied to a five-speed automatic transmission $T_3$. This third embodiment has first and third shaft portions and identical to those of the preceding embodiments, and these portions, designated by common reference numerals, will not again be described.

On the second shaft, or "counter shaft" 2 of the third embodiment, are arranged, in sequence from the engine side, the reduction gear 15, the counter driven gear 13, and a three-speed auxiliary transmission 55. As in the foregoing first embodiment, the counter shaft 2 is rotatably supported at its two ends through the roller bearing 43 and the needle bearing 45, respectively, by the case 19. The reduction gear 15 is splined to the front end portion of the counter shaft 2, and the counter driven gear 13 is rotatably supported, through the tapered roller bearing 46, by the counter shaft 2, adjacent to the reduction gear 15.

In the auxiliary transmission 55 the sun gears S4 and S5 of the first single planetary gear unit 56 and the second single planetary gear unit 57, are connected together in a Simpson type arrangement similar to that of the main transmission 11. A first carrier CR4 and a second ring gear R5 are individually connected to the counter shaft 2 and a first ring gear R4 is directly connected to the counter driven gear 13. A drum member 59 extends radially outward from the intermediate portion of the common sun gears S4 and S5. The third (direct) clutch C3 is interposed between the drum member 59 and the first carrier CR4. A hydraulic piston 60 is disposed for operation of the clutch C3, and the third brake B3, a band brake, is arranged around the drum member 59. The fourth brake B4 is a multi-disc brake and is interposed between the outer circumference of an extension from the second ring gear R5 and the case, and the second one-way clutch F2 is interposed between the inner circumference of that extension and a case boss portion 19e.

In the third embodiment, the location of the counter drive gear 12 on the first shaft 1 allows the counter drive gear 13, meshing with the drive gear 12, to be located close to the engine side so that the counter shaft 2 is arranged in its entirety close to the engine side. As a result, the plane of rotation A—A of the ring gear 16 and the reduction gear 15 meshed therewith is interposed between the supporting planes B—B and B'—B' of the differential unit 17.

The third embodiment operates according to the table of FIG. 9. Specifically, at the forward first speed, the forward clutch C1 and the first one-way clutch F1 (or the second brake B2) are applied to set the main transmission 11 in the 1st speed stage. On the other hand, the auxiliary transmission 55, like the main transmission, is in the 1st speed stage because the second one-way clutch F2 (or the fourth brake B4) is applied to lock the second carrier CR5. As a result, in the automatic transmission $T_3$, the rotation of the input shaft 1 is decelerated to the 1st speed stage by the main transmission 11, and this decelerated rotation is transmitted through the counter drive gear 12 and the counter driven gear 13 so that it is further decelerated by the auxiliary transmission 55 and transmitted to the differential unit 17.

At the forward 2nd speed, the main transmission 11 is shifted to the 2nd speed stage by the actions of the forward clutch C1 and the first brake B1 whereas the auxiliary transmission is left at the 1st speed stage so that overall the transmission $T_3$ establishes the 2nd speed.

In the forward 3rd speed, the main transmission 11 is left at the aforementioned 2nd speed stage whereas the auxiliary transmission 55 is brought to the 2nd speed stage because the rotation of the sun gears S1 and S2 is halted by the action of the third brake B3. As a result, overall the transmission $T_3$ establishes the 3rd speed.

In the forward 4th speed, the main transmission 11 remains at the aforementioned 2nd speed stage whereas the auxiliary transmission 55 is brought into the directly connected state, i.e., the 3rd speed stage, by the action of the third (direct) clutch C3, so that overall the transmission establishes the 4th speed.

In the forward 5th speed, the main transmission 11 is also brought into the directly connected state, i.e., the 3rd speed stage, because the direct clutch C2 is applied and, combined with the aforementioned directly connected (3rd speed) stage of the auxiliary transmission 55, establishes the 5th speed.

In reverse, the main transmission 11 is in a reverse state whereas the auxiliary transmission 55 is brought into the 1st speed stage by the action of the fourth brake B4, and this combination establishes a decelerated reverse for the overall transmission.

In the five-speed automatic transmission $T_3$ described above, the 3rd speed auxiliary transmission 55 can be arranged on the second shaft 2 with the second shaft 2 positioned close to the engine side, thereby providing a five speed automatic transmission $T_3$ with good mountability. Moreover, the auxiliary transmission may be of the relatively light Simpson type with satisfactory performance. In the third embodiment, also the plane of rotation A—A of the ring gear 16 is interposed between the supporting planes B—B and B'—B' of the differential unit 17 to improve the durability of the bearings 20 and 21.

Incidentally, the embodiments thus far described are exemplified by automatic transmissions for a transverse engine, FF (i.e., front engine/front drive) vehicle. However, the present invention is not limited to the FF vehicle but can likewise be applied to a four-wheel drive vehicle.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An automatic transmission for a transverse engine vehicle, comprising:

a casing;

a first shaft aligned with an engine crankshaft;

a second shaft and third shafts associated with front wheels of the vehicle, said second and third shafts being arranged with said first shaft in a triangular configuration in an end view;

a fluid coupling, a main transmission and a counter drive gear mounted on said first shaft, said counter drive gear being located between said fluid coupling and said main transmission and having a supporting boss portion extending toward said main transmission and supported by said casing;

a counter driven gear, meshing with said counter drive gear, and a reduction gear mounted on said second shaft; and a differential unit interposed between and driving said third shafts, said differential unit carrying a ring gear in meshing engagement with said reduction gear, said differential unit having left-hand and right-hand extensions which are supported by said casing through bearings;

wherein said first shaft extends from said fluid coupling through said counter drive gear for connection to at least one input element of said main transmission; and wherein said ring gear and said reduction gear rotate in a plane located between planes of support of said left-hand and right-hand extensions.

2. An automatic transmission for a transverse engine vehicle, according to claim 1, wherein said main transmission includes first and second single planetary gear units having integral sun gears;

wherein said first planetary gear unit includes a first carrier and a first ring gear and said second planetary gear unit includes a second carrier and a second ring gear, said first carrier and said second ring gear being connected to each other and to said counter drive gear, wherein said first shaft extends from said fluid coupling and is connected through a forward clutch to said first ring gear and through a direct clutch to said sun gears, wherein said first shaft extends from said fluid coupling to a rear end of said casing where it is connected to said forward clutch and said direct clutch;

first retaining means for locking said sun gears against rotation; and second retaining means for locking said second carrier against rotation.

3. An automatic transmission for a transverse engine vehicle, according to claim 2, further comprising a two speed auxiliary transmission arranged on said second shaft and including a single planetary gear unit.

4. An automatic transmission for a transverse engine vehicle, according to claim 1, further comprising a two speed auxiliary transmission arranged on said second shaft and including a single planetary gear unit.

5. An automatic transmission for a transverse engine vehicle, according to claim 1, wherein said counter driven gear and said reduction gear are fixed on said second shaft.

6. An automatic transmission for a transverse engine vehicle, according to claim 2, wherein said counter driven gear and said reduction gear are fixed on said second shaft.

7. An automatic transmission for a transverse engine vehicle, according to claim 1, further comprising a three speed auxiliary transmission arranged on said second shaft and including a composite planetary gear unit.

8. An automatic transmission for a transverse engine vehicle, according to claim 2, further comprising a three speed auxiliary transmission arranged on said second shaft and including a composite planetary gear unit.

* * * * *